United States Patent
Lee et al.

(10) Patent No.: US 7,136,031 B2
(45) Date of Patent: Nov. 14, 2006

(54) REFLECTING THREE-DIMENSIONAL DISPLAY SYSTEM

(76) Inventors: Byoungho Lee, Sinsigaji Apt. 1-danji, 131-403, Mok 6 dong, Yangcheon-ku, Seoul (KR) 158-751; Yoonchan Jeong, Daewoo Apt. 102-2004, Imoon-dong 45, Dongdaemoon-ku, Seoul (KR) 130-763; Sung-Wook Min, Changsung-dong 86, Jongro-ku, Seoul (KR) 110-340; Sungyong Jung, 409-221, Shinlim-dong, Kwanak-ku, Seoul (KR) 151-010; Jae-Hyeung Park, Boram Apt. 204-306, Sanggye 9-dong, Nowon-ku, Seoul (KR) 139-768

( * ) Notice: Subject to any disclaimer, the term of this patent is extended or adjusted under 35 U.S.C. 154(b) by 411 days.

(21) Appl. No.: 10/450,978

(22) PCT Filed: Dec. 17, 2001

(86) PCT No.: PCT/KR01/02190

§ 371 (c)(1),
(2), (4) Date: Jun. 18, 2003

(87) PCT Pub. No.: WO02/51165

PCT Pub. Date: Jun. 27, 2002

(65) Prior Publication Data

US 2004/0061934 A1    Apr. 1, 2004

(30) Foreign Application Priority Data

Dec. 18, 2000  (KR)  ............................... 2000-77943
Dec. 17, 2001  (KR)  ............................... 2001-79939

(51) Int. Cl.
*G09G 3/00* (2006.01)
*G09G 5/00* (2006.01)
*G09G 3/04* (2006.01)

(52) U.S. Cl. ............................. 345/32; 345/6; 345/31; 345/33

(58) Field of Classification Search ................ 345/6–9, 345/30–35, 156–169; 359/443, 465, 630–649
See application file for complete search history.

(56) References Cited

U.S. PATENT DOCUMENTS 5,317,405 A * 5/1994 Kuriki et al. ............ 348/14.16

(Continued)

FOREIGN PATENT DOCUMENTS

JP         07-159963        6/1995

(Continued)

OTHER PUBLICATIONS

2000 Electronic Information Communication Society General Meeting D-11-115 (p. 115) a.
Okano, F et al. Applied Optics vol. 36,No. 7 Mar. 1, 1997 Real-time pickup method for a three-dimensional image based on inegral photography.

*Primary Examiner*—Vijay Shankar
(74) *Attorney, Agent, or Firm*—Gifford, Krass, Groh, Sprinkle, Anderson & Citkowski, P.C.

(57) ABSTRACT

The present invention provides a reflection-type three-dimensional display system. The present invention comprises an image providing device that provides elemental images; an image displaying device that displays the elemental images; a projective lens system that is located along the same axis as the image providing device; and a concave mirror array that is located along the same axis as the projective lens system. The projective lens system projects the image that is displayed by the image displaying device to the concave mirror array, and the concave mirror array reflects and integrates the projected image and therefore displays the three-dimensional image.

3 Claims, 6 Drawing Sheets

U.S. PATENT DOCUMENTS

| | | | |
|---|---|---|---|
| 5,726,800 A * | 3/1998 | Ezra et al. | 359/466 |
| 6,061,489 A * | 5/2000 | Ezra et al. | 385/115 |
| 6,062,693 A * | 5/2000 | Sato | 353/7 |
| 6,147,782 A * | 11/2000 | Daiber et al. | 359/1 |
| 6,292,305 B1 * | 9/2001 | Sakuma et al. | 359/649 |
| 6,765,566 B1 * | 7/2004 | Tsao | 345/419 |
| 2002/0030887 A1 * | 3/2002 | Hamagishi et al. | 359/463 |

FOREIGN PATENT DOCUMENTS

| | | |
|---|---|---|
| JP | 8-160356 | 6/1996 |
| JP | 8-163603 | 6/1996 |
| JP | 10-239029 | 9/1998 |
| JP | 10-239092 | 9/1998 |
| JP | 2000308091 | 11/2000 |

* cited by examiner (a) Convex lens (b) Concave mirror

REFLECTING THREE-DIMENSIONAL DISPLAY SYSTEM

BACKGROUND OF THE INVENTION (a) Field of the Invention

The present invention relates generally to three-dimensional display system. More particularly, the present invention relates to three-dimensional display system of reflection-type.

(b) Description of the Related Art

Among the technologies that display three-dimensional image, IP(Integral Photography) which uses a lens array was first proposed by Lippmann in 1908. IP has not attracted much attention due to the limitation of the image capturing and displaying device. Recently IP begins to be studied extensively with the development of the high resolution image capturing and displaying device.

FIG. 1 shows the basic principle of the IP. IP consists of two functional parts (pickup/display) as shown in FIG. 1. In pickup part, many perspectives (that are called elemental images) of the three-dimensional object from various directions which are formed by the elemental lenses that constitute the lens array are captured and stored by the image capturing device. In display part, the reverse process of the pickup is performed. That is, the elemental images that were stored by the image capturing device are displayed by image displaying device, and the rays from the elemental images retrace through the lens array to integrate the three-dimensional image at the position where the original three-dimensional object was.

FIG. 2 is a more detailed image that depicts the image reconstruction principle of the IP. The elemental images which are displayed on the image displaying device (FIG. 2(a)) are integrated by the lens array (FIG. 2(b)) around the image plane position (FIG. 2(c)) of the lens array. The depth of the three-dimensional image is adjusted according to the spacing between the elemental images and therefore three-dimensional image can be displayed.

While conventional IP using the film as the pickup and displaying device could not display animation, a developed IP using the charge coupled device (CCD) camera and flat display panel (such as liquid crystal display (LCD) or cathode ray tube (CRT)) can display three-dimensional animation as well as still three-dimensional image. FIG. 3 shows the setup of the IP adopting the CCD camera and LCD panel as the pickup and display device respectively.

Three-dimensional display based on the IP can display three-dimensional image without any viewing aids (such as glasses) and provides continuous viewpoints However, realization of large size three-dimensional display based on the IP is difficult because large size lens array which is a major component of IP can not be readily made.

SUMMARY OF THE PRESENT INVENTION

Therefore, the object of the present invention is to provide a reflection-type three-dimensional display which can readily be made for large size based on IP.

For this object of the present invention, according to one aspect of the present invention, a reflection-type three-dimensional display system comprises: an image providing device that provides elemental images; an image displaying device that displays the elemental images; a projective lens system that is located along the same axis as the image providing device; and a concave mirror array that is located along the same axis as the projective lens system. The projective lens system projects the image that is displayed by the image displaying device to the concave mirror array, and the concave mirror array reflects and integrates the projected image and therefore displays the three-dimensional image.

Wherein, the concave mirror array includes spherical or non-spherical concave mirrors according to the direction and distance of projection of the elemental images. In addition, the concave mirror array can be curved itself as a whole to be non-plane as well as plane according to the direction and distance of projection of the elemental images.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF PREFERRED EMBODIMENTS

Figure 1:
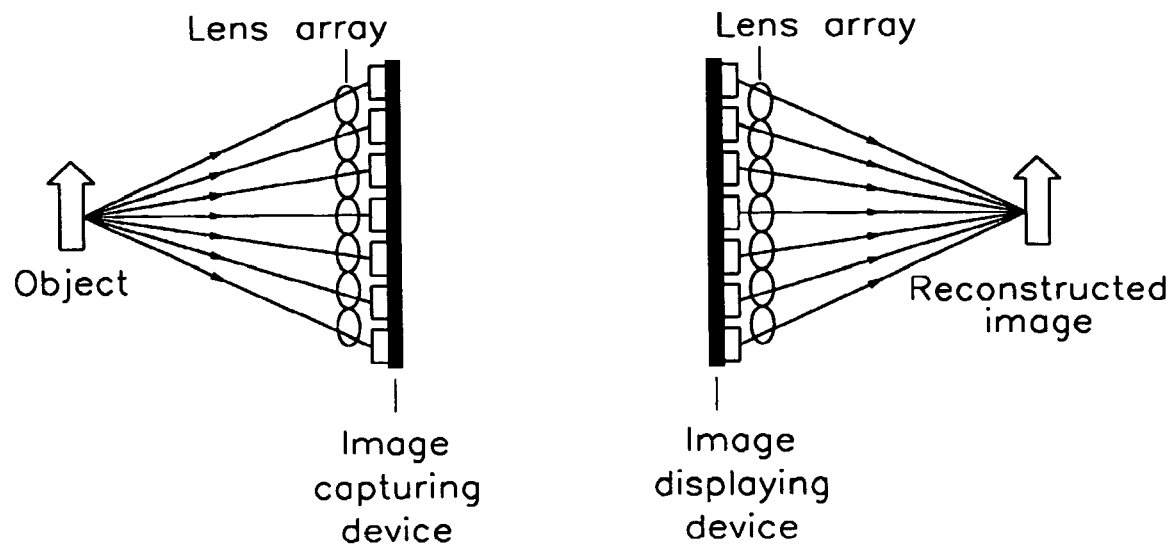
FIG. 1 shows the basic concept of the conventional IP(Integral Photography).
Figure 2:
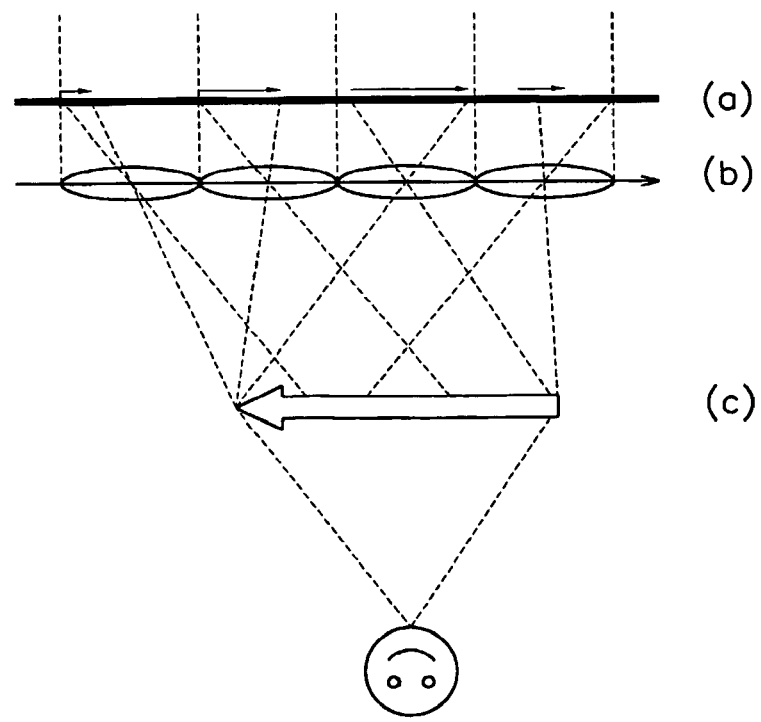
FIG. 2 shows an image that shows the image reconstruction principle of IP.
Figure 3:
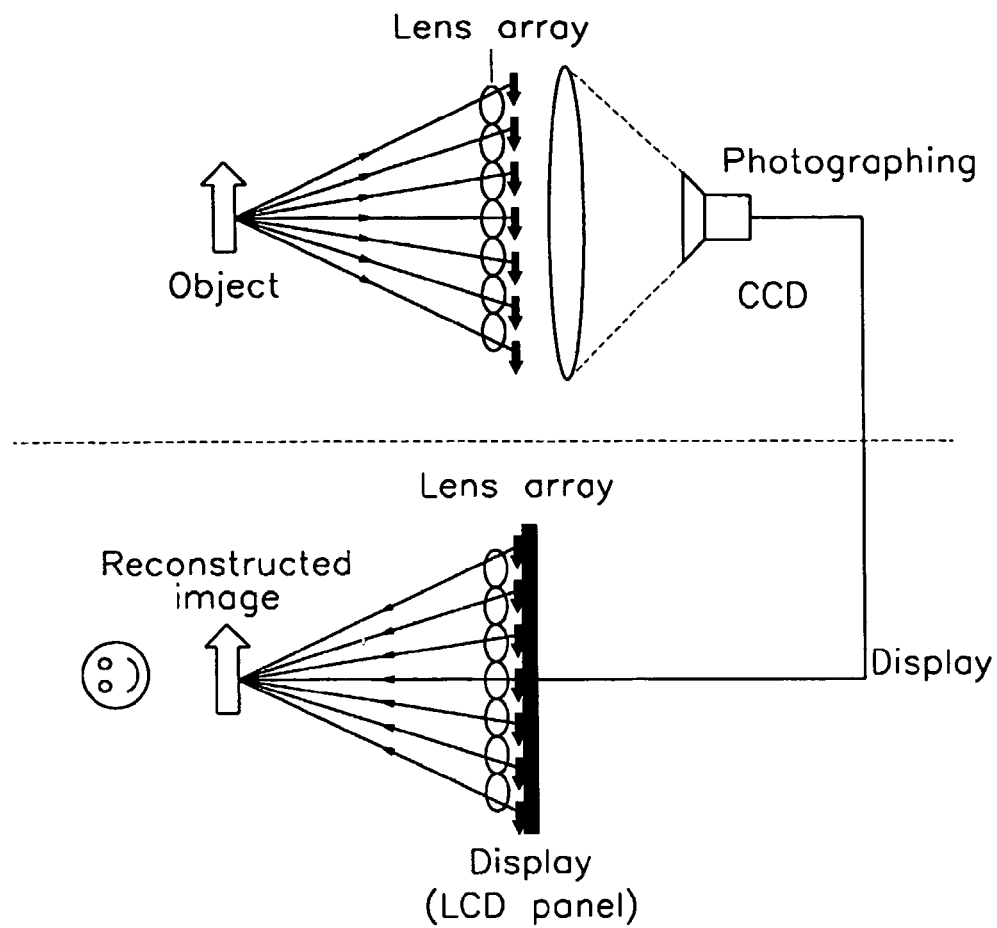
FIG. 3 shows the conventional IP that displays three-dimensional animation (moving picture).

The features and advantages of the present invention will become more apparent from the detailed description of preferred embodiments with reference to the accompanying drawings, like reference numerals are used for description of like or equivalent parts or portions for simplicity of illustration and explanation.

In general, the most major problem of the large size three-dimensional display based on IP is the difficulties in manufacturing a large size lens array, and assembling the lens array and the projection display system which can readily be made large.

Therefore, if we make the large size three-dimensional display by the use of the lens array, the size of the display itself becomes too big. Moreover, it is also not easy to place the large size lens array in front of the large size display in parallel. Consequently, the three-dimensional display based on IP by the use of the lens array can hardly be made for large size.

Figure 4:
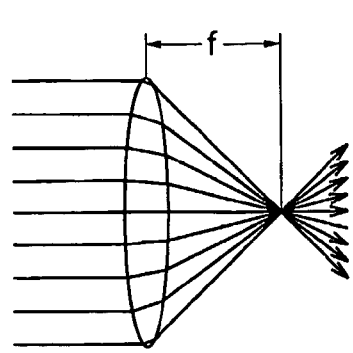
FIG. 4 depicts the characteristics of the convex lens and the concave mirror.
Figure 4:
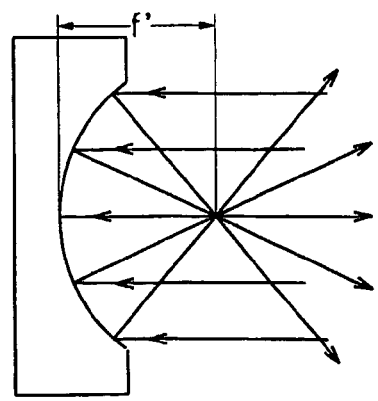
Figure 5:
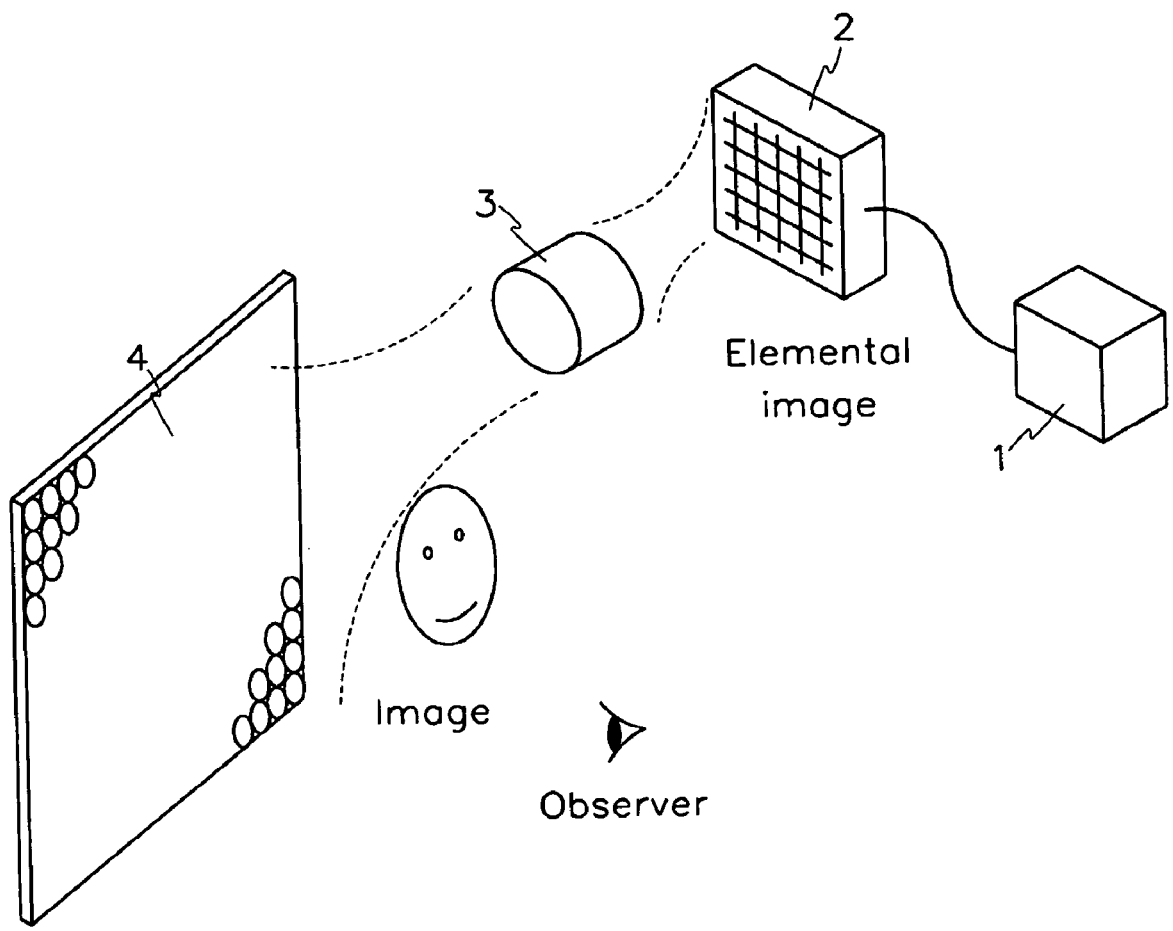
FIG. 5 shows the reflection-type three-dimensional display system, according to a preferred embodiment of the present invention.

On the other hand, a convex lens and a concave mirror have similar optical characteristics except the change of the optical axis. FIG. 4 shows the characteristics of the general convex lens and concave mirror.

While a convex lens focuses light on the focal length f in the direction of the incident light propagation as shown in FIG. 4(a), a concave mirror focuses light on the focal length f' in the opposite direction of the incident light propagation (that is the direction of the reflected light) as shown in FIG. 4(b). In other words, a concave mirror performs optically equivalent function except a point that the concave mirror reflects light while the convex lens refracts light.

With this fact, in the preferred embodiment of the present invention, the reflection-type three-dimensional display system uses concave mirror array instead of convex lens array.

In the embodiment, the concave mirror array can be placed far from the image displaying device which displays the elemental images, and the system can display three-dimensional image by projection type. Therefore the image displaying device does not need to be the same size as the concave mirror array, consequently the large size three-dimensional display can be easily achieved by the use of the small image displaying device such as SLM (Spatial Light Modulator).

The reflection-type three-dimensional display system according to the preferred embodiment of the present invention includes an image providing device 1 which provides the elemental images, an image displaying device 2 which displays the elemental images provided by the image providing device 1 (projective display device), a projective lens system 3 and a concave mirror array 4, which are placed sequentially along the same axis as the image displaying device 2.

The image providing device 1 can be a device which takes still or moving picture. For example, it can be a CCD camera that includes a lens which images the object, an image capturing device which outputs the electronic signal about the object imaged by the lens, and a signal processing unit which forms the elemental images by processing (noise reduction, signal amplification, i.e.) the electronic signal output provided by the image capturing device. Or the image providing device 1 can be a computer that computes and forms the elemental images according to the input information.

The image displaying device 2 (projective display device) displays the elemental images provided by the image providing device 1. The image displaying device 2 includes a spatial light modulator such as LCD or DMD (Deformable Mirror Device), a control unit which drives the spatial light modulator according to the elemental images provided by the image providing device 1, and the light source which projects light on the spatial light modulator.

The technology that displays images in the image displaying device which consists of the projective display device has been well known and we skip a detailed description.

The projective lens system 3 which includes at least one or more projective lenses, collects light from the elemental images and projects it to the concave mirror array 4.

The concave mirror array 4 consists of many elemental concave mirrors aligned in a N×M (N=M or N≠M) matrix form. Wherein, the each concave mirror which can be spherical or non-spherical forms image at a certain distance according to the direction and distance of projection like a convex lens.

Generally, while spherical concave mirror is used in many optical systems because it can be readily manufactured, it has a spherical aberration. The non-spherical concave mirror is manufactured to have no aberration. Therefore, it can be the that it is preferred to use the concave mirror array which consists of the non-spherical concave mirrors. However, there is no difficulties in proving or showing the desired performance of the present invention even if we use the concave mirror array which consists of the spherical concave mirrors. On the other hand, the concave mirror array plane (a plane on which the concave mirrors are placed) can be flat or curved.

The operation of the reflection-type three-dimensional display system according to the preferred embodiment of the present invention will now be described.

The image providing device 1 makes elemental images by pick-up or calculation and provides them to the image displaying device 2, and the image displaying device 2 which consists of the projective display devices displays the elemental images.

The projective lens system 3 projects the elemental images displayed by the image displaying device 2 to the concave mirror array 4, and the projected elemental images are reflected by the concave mirror array 4 and integrated to form the three-dimensional image.

Figure 6:
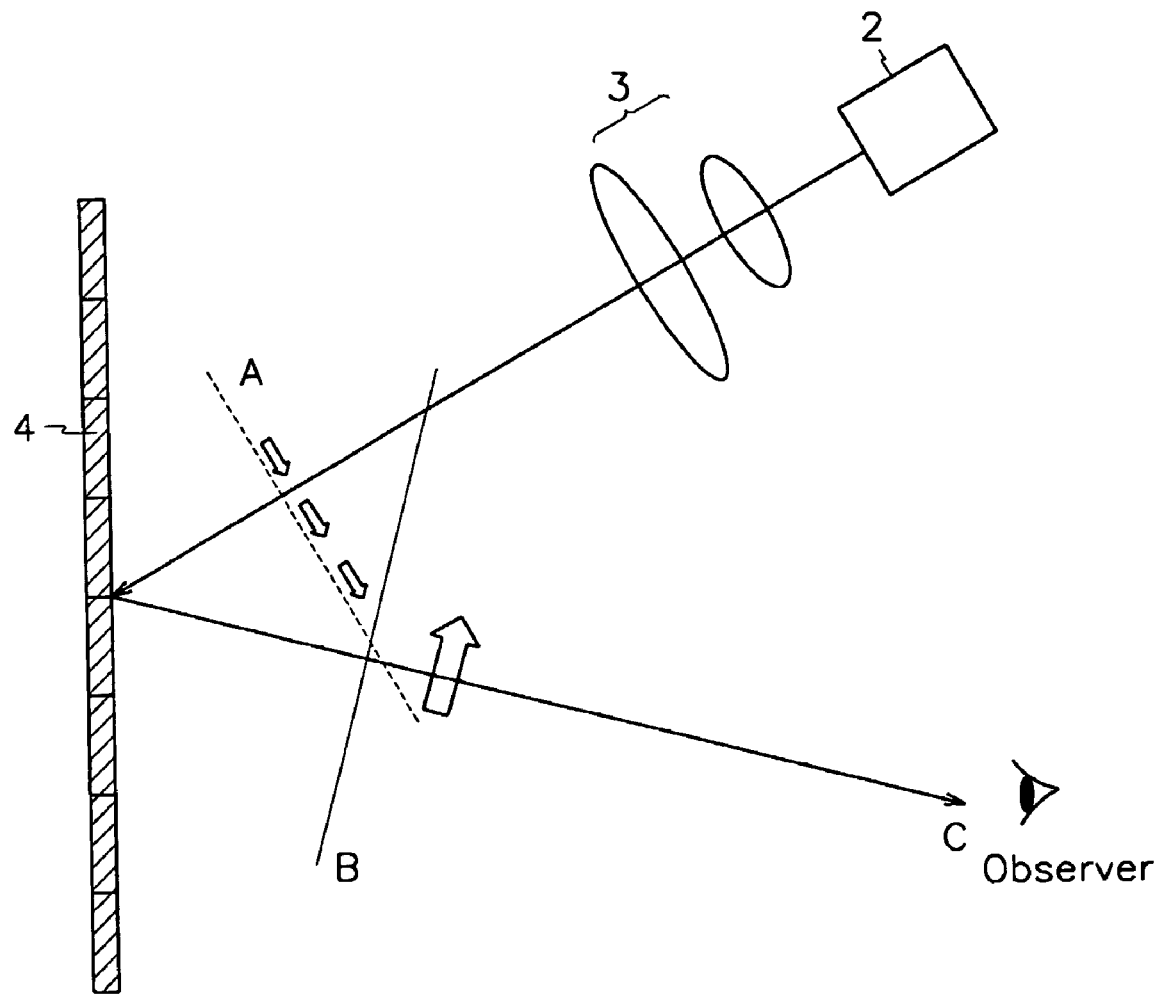
FIG. 6 shows the image reconstruction principle of the reflection-type three-dimensional display system, according to the preferred embodiment of the present invention.

FIG. 6 shows the principle of displaying the three-dimensional image by the reflection-type three-dimensional display system according to the preferred embodiment of the present invention in more detail.

The elemental images which are displayed by the image displaying device 2 are projected near the concave mirror array 4 (position A) as shown in FIG. 6. Then the projected elemental images are integrated in the vicinity of the position B by the concave mirror array 4 with the depth and therefore the observer can see the three-dimensional image at a position C.

Figure 7A:
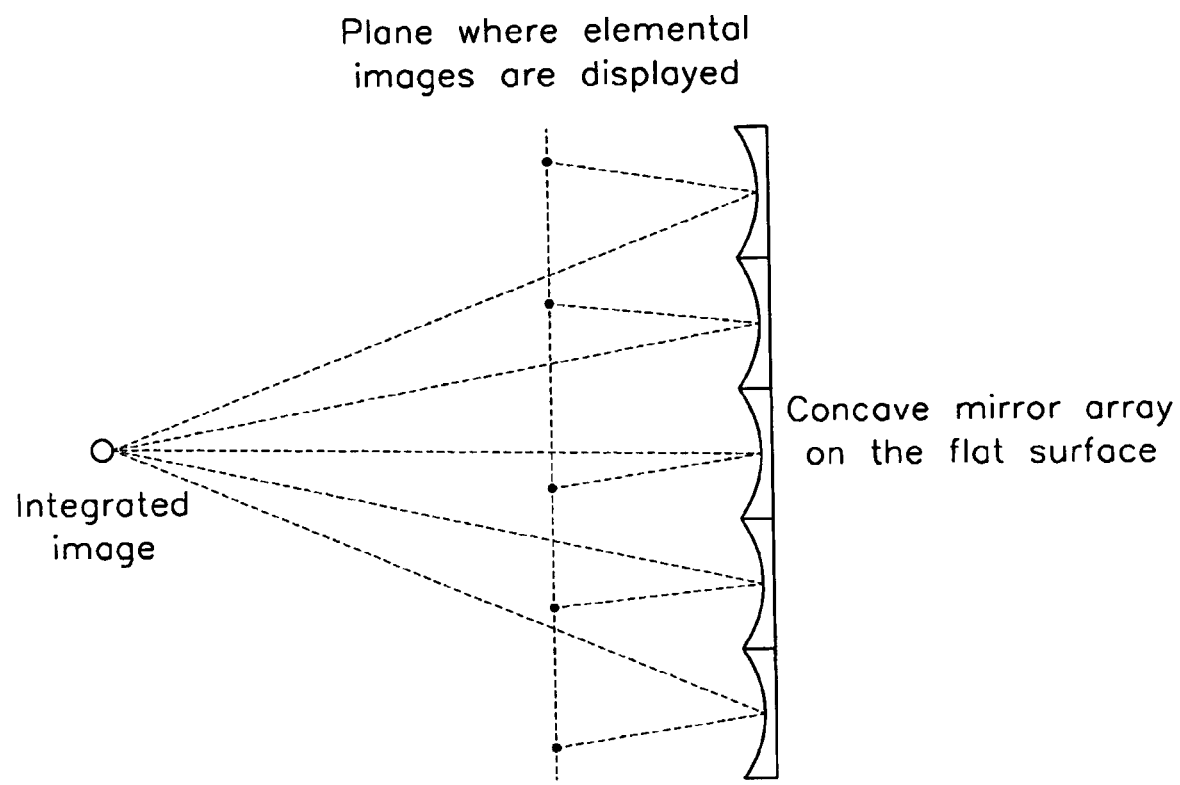
FIG. 7A and FIG. 7B show examples of the concave mirror array according to the preferred embodiment of the present invention.
Figure 7B:
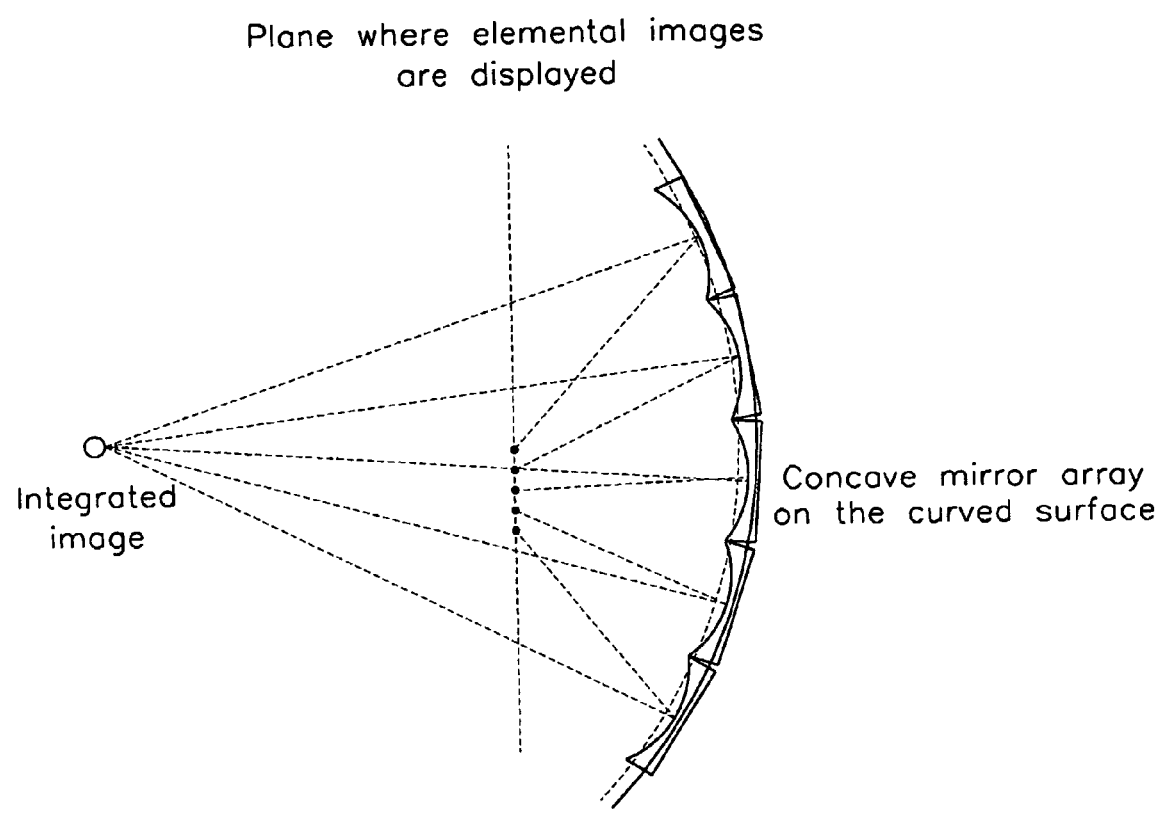

The concave mirror array plane is not necessarily flat and it can have curved shape. FIG. 7A and FIG. 7B show the examples of the concave mirror array of flat concave mirror array plane and curved concave mirror array plane. As shown in FIG. 7A, when the concave mirror array plane is flat, in order that the observer can see the three-dimensional image, the elemental images should be placed in wider area at the image plane where the elemental images are imaged and therefore the size of the image displaying device should be larger than when the concave mirror array plane is curved.

When the concave mirror array plane is curved as shown in FIG. 7B, because the curved concave mirror array plane collects the diverging light, the size of the image displaying device can be smaller than when the concave mirror array plane is flat and the difficulty in observing the three-dimensional image which originates from the diverging of the projected light ravels out.

Wherein, the curvature and the size of the concave mirror array plane is determined by the size and the amount of the divergence of the elemental images which are displayed by the image displaying device and projected by the projective lens system. Therefore this kind of setup has advantages because the large size display device is not necessary and the beam projector can be used to make large size three-dimensional display system.

While the present invention has been particularly shown and described with reference to specific preferred embodiments, it should be understood by those skilled in the art that various changes in form and detail may be made therein without departing from the spirit and scope of the present invention as defined by the appended claims.

As described above, the preferred embodiment of the present invention provides a reflection-type three-dimensional display using a concave mirror array and readily displays a large size three-dimensional image because the elemental images are projected by the projective lens system to large concave mirror array that can be manufactured relatively easily.

What is claimed is:

1. A thee-dimensional display system comprising:
   an image providing device which provides elemental images;

an image displaying device which displays the elemental images;

a projective lens system which is aligned along the same axis as the image display device and projects the elemental images;

a concave mirror array which is aligned along the same axis as the projective lens system, includes at least one or more concave mirrors, and said concave mirror array comprising a plurality of concave mirrors arranged in a matrix, and wherein said concave mirror array forms three-dimensional image by reflecting and integrating the projected elemental images; and a concave mirror array plane of said concave mirror array is flat or curved according to the direction or distance of projection of elemental images.

2. The thee-dimensional display system of claim 1, wherein each concave mirror of the concave mirror array is spherical or non-spherical according to the direction or distance of projection of elemental images.

3. The three-dimensional display system of claim 1, wherein a concave mirror array plane of the concave mirror array is curved.

* * * * *